(12) United States Patent
Garreau et al.

(10) Patent No.: US 6,760,384 B1
(45) Date of Patent: Jul. 6, 2004

(54) METHOD FOR THE DISTRIBUTION OF INFORMATION

(75) Inventors: Dominique Garreau, Vaureal (FR); Thierry Fernandez, Paris (FR)

(73) Assignee: Kurtosis Ingenierie S.A., Courbevoi Cedex (FR)

( * ) Notice: Subject to any disclaimer, the term of this patent is extended or adjusted under 35 U.S.C. 154(b) by 564 days.

(21) Appl. No.: 09/627,716

(22) Filed: Jul. 28, 2000

(30) Foreign Application Priority Data

Jul. 29, 1999 (FR) .......................................... 99 09871

(51) Int. Cl.$^7$ ................................................ H04B 3/54
(52) U.S. Cl. ........................................ 375/260; 375/220
(58) Field of Search .................................... 375/222, 260, 375/279, 295, 259, 308, 220; 370/335, 336, 342, 343, 441, 442, 293, 294, 295, 315, 401, 463, 492; 340/310.01, 286; 725/106, 117, 118, 136

(56) References Cited

U.S. PATENT DOCUMENTS

| | | | | |
|---|---|---|---|---|
| 4,267,592 A | * | 5/1981 | Craiglow | 370/29 |
| 4,502,137 A | * | 2/1985 | Tan | 370/85 |

(List continued on next page.)

FOREIGN PATENT DOCUMENTS

| | | |
|---|---|---|
| DE | 197 16 011 | 10/1998 |
| EP | 0 975 097 | 1/2000 |

OTHER PUBLICATIONS

Dickman et al., Digital Signal Processing for Multi–Carrier Data Transmission on Phase–Controlled Power Lines with Nonlinearities, *International Symposium on Circuits and Systems*, pp. 889–892 1995.

(List continued on next page.)

*Primary Examiner*—Mohammad H. Ghayour
*Assistant Examiner*—Dung X. Nguyen
(74) *Attorney, Agent, or Firm*—Patterson, Thuente, Skaar & Christensen, P.A.

(57) ABSTRACT

To be able to transmit information at high bit rate in a domestic or industrial installation, it is planned to receive information at high bit rate sent by a remote sender unit to a specialized receiver. This specialized receiver playing the role of a network master is then provided with means to transmit this information by a carrier current channel made on the electrical network of the installation. In reception, a coupler is used to pick up this information from the electrical network. It is shown that, by acting in this way, it is possible to remove the need to make a specific infrastructure for this transmission at high bit rate, and that it is thus possible to enjoy the facility of having tapping points at all places since an electrical power supply network is generally distributed extensively in a building. Furthermore, several characteristics of modulation and transmission are chosen to withstand parasites and defects of transmission inherent in this type of network. It is shown, especially, that the characteristics chosen for this occasion may also be used in a different context. In particular, it is planned that a time equalization of the channel, which is costly, is not done systematically in a sender unit and a receiver but only in one or the other, and that, furthermore, this channel time equalization can concern only certain frequencies of a total spectrum sent, namely those frequencies for which the signal-to-noise ratio is good whereas, for the others, the efficiency of the equalizer is lower.

27 Claims, 3 Drawing Sheets

U.S. PATENT DOCUMENTS

| | | | | |
|---|---|---|---|---|
| 4,506,361 A | * | 3/1985 | Kume | 370/85 |
| 4,507,778 A | * | 3/1985 | Tan | 370/94 |
| 6,040,759 A | * | 3/2000 | Sanderson | 340/310.01 |
| 6,055,268 A | * | 4/2000 | Timm et al. | 375/229 |
| 6,249,213 B1 | * | 6/2001 | Horne | 340/310.01 |
| 6,266,348 B1 | * | 7/2001 | Gross et al. | 370/493 |
| 6,307,868 B1 | * | 10/2001 | Rakib et al. | 370/485 |
| 6,353,629 B1 | * | 3/2002 | Pal | 375/222 |
| 6,442,211 B1 | * | 8/2002 | Hampel et al. | 375/260 |
| 6,560,209 B1 | * | 5/2003 | Alamouti et al. | 370/330 |

OTHER PUBLICATIONS

Cioffi et al., Very–High–Speed Digital Subscriber Lines, *IEEE Communications Magazine*, vol. 37, No. 4, Apr. 1999, pp. 72–79.

Ramseler et al., MV and LV Powerline Communications:New Proposed IEC Standards, *1999 IEEE Conference*, Apr. 1999, pp. 235–239.

* cited by examiner

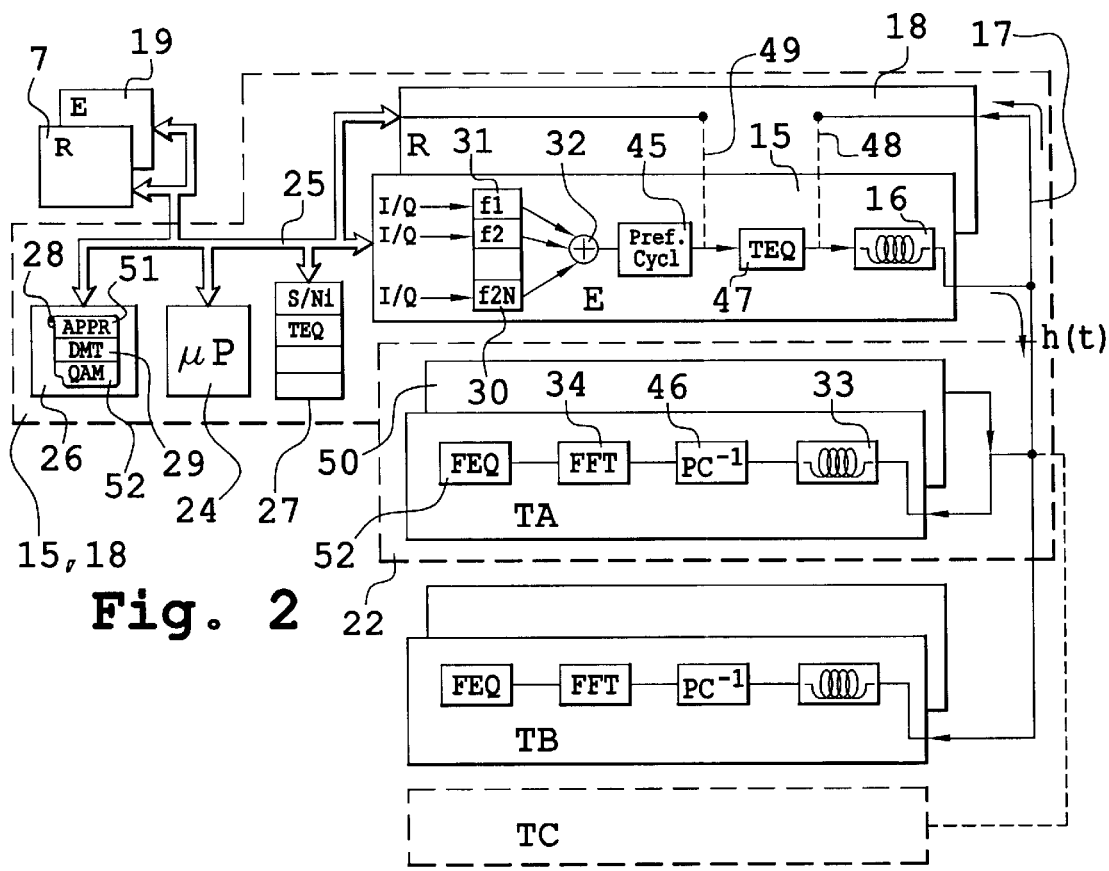
Fig. 2
Fig. 5
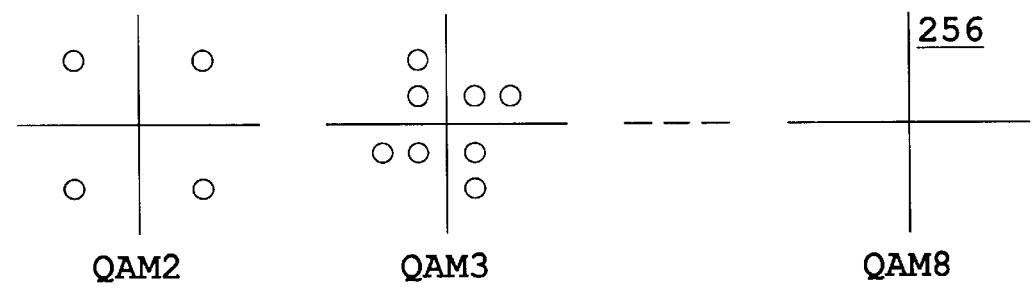
QAM2  QAM3  QAM8
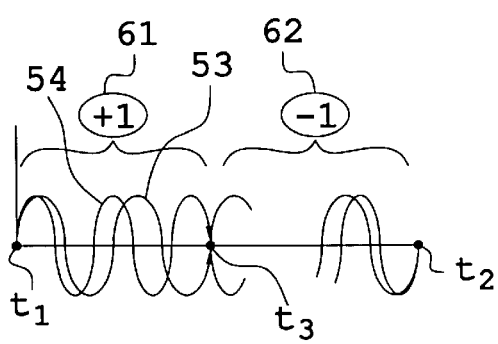
Fig. 6
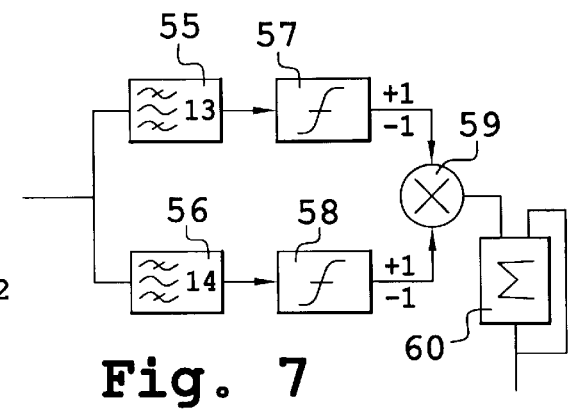
Fig. 7

METHOD FOR THE DISTRIBUTION OF INFORMATION

BACKGROUND OF THE INVENTION

1. Field of the Invention

An object of the present information is a method for the distribution of binary information at high bit rates. It is aimed at using existing infrastructures to transmit information. The invention is more particularly useful in a small environment even if its use can be envisaged in a very big geographical area

2. Description of the Related Art

In the field of information transmission, the article by John M. Cioffi et al, "Very High Speed Digital Subscriber Lines" the IEEE Communications Magazine, April 1999, pp 72 to 79, lists all the techniques that can be used to transmit information at a high bit rate on a subscriber line consisting typically of a pair of copper wires, especially twisted copper wires. It is known that successive statements have been issued in this field, laying down the limits of transmissible bit rates and extending these limits each time. In practice, in these techniques, we distinguish between HDSL (High Speed Digital Subscriber Line) techniques that can be used with bit rates of the order of 100 Kbit per second over hundreds of kilometres, ADSL (Asymmetrical Digital Subscriber Line) techniques which are asymmetrical subscriber lines permitting bit rates of 1 to 2 Mbit per second over several kilometres, and VDSL (Very High Speed Digital Subscriber Line) techniques that allow bit rates of about 10 Mbit per second over very short distances, for example distances of 300 m.

Furthermore, especially in the field of home automation, there are known infrastructural problems related to the installation of high bit-rate connections in houses and office buildings. Indeed, the arrival of a coaxial cable head, a twisted pair, an optic fibre or a satellite port for television distribution opens the door to uses of the Internet through the access offered by the cable operator who has installed the cable. The drawback of this technique is that the coaxial cable thus brought in provides only one head, i.e. only one place of use. In home use, it may be useful to have a pending connector available at several points in a house for the connection, on demand, of a piece of equipment or making it possible, with this connection, to obtain a high bit rate accessible with a coaxial cable of this kind. A coaxial cable of this kind may furthermore be used on a multipoint basis by providing each end that is left unconnected with a circuit having a characteristic impedance. These circuits generally take the form of a plug that can be connected to a BNC type connector. This type of distribution is used especially in the field of office information technology systems for small local-area networks.

The drawback of this coaxial cable technique however is that the distribution of the access points through a dwelling or a building implies infrastructural works, cable passages and the making of connection outlets.

There are also possibilities of using a telephone line that comes into a subscriber's home. In this case two problems persist. Firstly, the distribution of the access points is not as general as users might wish even if, in modern dwellings, the presence of telephone sockets in each room of the dwelling is becoming a norm. However, this method of transmission suffers from the existing passband limits in the subscriber line concentrators used to connect several dwellings in an area of dwellings to a telephone exchange. In practice, the circuits of the concentrators have passbands that are below 100 KHz, thus making it possible to attain the high bit rates envisaged above, namely bits rates of the order of 10 Mbits per second.

OBJECTS AND SUMMARY OF THE INVENTION

To resolve this problem, the invention makes use chiefly of a technique of carrier currents. To set up a carrier current channel, it is necessary first of all that a sender unit or a receiver of signals to be transmitted should be coupled to an existing conductive line, generally the electrical power supply line of a building, or possibly on of the many telephone distribution lines subdivided into a tree structure in this building. A coupling of this type is known. It has the effect of isolating the sender unit and the receiver from the power signals distributed on the line which, in the present case, are of the order of 50 Hz for the electrical power supply or from the telephone signals whose frequency is below 30 KHz. At the same time, it has the effect of giving rise to an electrical decoupling in order to prevent the high voltage present on the line, an electrical supply voltage of about 220 Volts or 110 Volts, or an 80-volt pulse voltage in the case of a ringing sound conveyed by a telephone line, from disturbing the working of this sender unit and its receiver. Furthermore, a coupler of this kind couples the line in use, which may be the electrical power supply line or the existing telephone line, of the information to be transmitted or received.

In this case, the passband of this transmission is offset. In a preferred example of the invention, this passband will range from 150 KHz to a little more than 5 MHz. Indeed, beyond 5 or 6 MHz, the carrier current channel does not propagate the signals properly unless very complex solutions are contrived. In the invention, binary information elements at high bit rate are then received at a point of access to a global network, especially by a coaxial cable, an optical fibre, a twisted pair or the like, in a specialised receiver, for example a decoder provided by a cable operator. This binary information at high bit rate may be, firstly, television signals in the known passbands and, secondly, data signals resulting for example from an Internet connection on the part of the user and a transmission of the results of a request made by this user. The decoder or master device of the invention decodes the received signals and sends them to a user terminal, typically a microcomputer in the context of an Internet use, by means of a carrier current link. This network master device thus distributes the access to the total network, throughout the building, in carrier currents.

In this respect, an object of the invention is a method of distribution of binary information elements at high bit rate coming from a remote sender unit wherein:

a stream of information elements is received in a specialised receiver linked to the remote sender unit, this stream of information elements is transmitted from the specialised receiver to a user terminal located in the vicinity, characterised in that:

the stream of information elements, after decoding in the specialised receiver, is retransmitted between the specialised receiver and the user terminal on a network, for example an electrical power supply network.

In another field, namely that of DMT or Discrete Multi-Tone mode modulation, there are known ways of transmitting information elements between a sender unit and a receiver by separating a wide passband, herein typically ranging from 150 KHz to more than 5 MHz in the example, into a large number of contiguous elementary frequency bands. In the example which will be taken hereinafter in the invention, a number of frequencies equal to 128 is chosen. The width for each of these frequencies is 39.0625 KHz giving a total bandwidth of 5 MHz. In this context, a specific problem appears because of a tree-structure network such as an electrical power supply mains network in a house. This specific problem is that of the numerous reflections to which the terminations of this network subject the signals that propagate therein. The channel thus constituted between two given points of this network is not very comfortable to use because it is the site of these reflections, also because it has a changing nature and finally because it is highly noise-ridden.

It is furthermore changing in nature because it is enough for the user to connect an electrical instrument to a current outlet or, quite simply, light up a lamp for the circuit of the distributed reflections to be overturned and cause other disturbances or different disturbances. Finally, a carrier current channel of this kind is noise-ridden because certain machines such as vacuum cleaners, washing machines or heating installations, when starting, have cosine $\phi$ values different from 1 and are therefore the site of noises whose duration is typically in the range of one millisecond to ten milliseconds.

It is also possible to distinguish narrow-band interference noises resulting from public or institutional sender units sending in a band of about 200 KHz for which the distributed network is a pick-up antenna. Furthermore, at a frequency of 150 KHz, the intervention of noises caused by radio amateurs is noted. The above-quoted article discusses the intervention of these noises in certain frequency bands of the multifrequency channel. Whereas, theoretically, the interference should be limited to a single subband, in practice it has been shown that numerous related bands are also disturbed.

These channel defects are echoed in a pulse response of the carrier current channel typically leading to a build-up time of about 15 microseconds. To resolve the problem inherent in this non-zero response time, there are known ways of transmitting binary information elements of the blocks and separating the blocks by a guard time equal to the duration of the pulse response of the channel. The guard time thus constituted then acts on the whole as factor of reduction of the useful bit rate. As shall be seen hereinafter, it will become necessary to provide for information blocks whose transmission time is in the range of 25.6 microseconds. In this case, the presence of a 15-microsecond guard time is incompatible with use: it makes the transmission capacity of the channel drop by almost 50%. The problem entailed by this lengthy pulse response duration is then resolved by placing time equalizers (TEQ) in the circuits connected to such channels.

The purpose of time equalizers such as these, briefly, is to prompt a sending delay for certain spectral components that propagate more quickly (for example, high spectral components) as compared with ahead-of-time sending for other spectral components (for example low spectral components). The result thereof is that, perceived from the terminal, the signals all seem to arrive at the same time, without undergoing the effects of intersymbol interferences from this slow pulse response of the channel. In practice, it is possible to easily lower the pulse response of the signal from fifteen microseconds to five microseconds, but not to zero microseconds which would be the ideal solution.

In the invention, this problem is also resolved by placing time equaliser circuits on the transmission path. However, owing to the complexity of these temporal equaliser circuits, their cost is high. To then substantially reduce the cost of the installation, it is planned in the invention to preferably use only one time equaliser circuit per installation. This equaliser circuit will be installed in a network master circuit, typically the decoder envisaged further above. In its downward relationship with user terminals, the equaliser circuit that makes an a priori time equalisation: the high-frequency components are delayed before they are sent. In the other, upward direction, when the user terminal sends information to the central circuit, the decoder, the equaliser circuit delays the high-frequency components before processing them. Thus, the communication between the decoder and the user terminal may take place as if the response time of the channel were reduced. Typically, it will be reduced to less than 5,6 microseconds instead of the known duration of 15 microseconds.

In this case, if there are several user terminals and if these terminals are to be capable of exchanging information with one another, the high bit rate of transmission between them will be obtained by preliminary transmission to the master circuit and by the re-sending, by the master circuit to another user terminal, of information sent by a first user terminal. However, even by acting in this way, the computation time of the equaliser circuit is still high. Indeed, this computation must be done at each major change in the pulse response of the channel, which is particularly frequent in carrier currents. In the invention, this computation time is reduced by simplifying this equaliser circuit, in bringing it into play only for a limited number of spectral components, namely those for which the signal-to-noise ratio is the best. It will be shown that this action brings the desired result at lower cost.

An object of the invention therefore is a method for the distribution, at high bit rate, of information coming from a sender unit, in which:

a channel is used to send a stream of information between a sender unit and a receiver, especially by a carrier current channel formed by an electrical power supply network, the information elements of the stream of information are modulated with a DMT or discrete multitone mode of modulation that is preferably synchronised and preferably on $2^N$ carriers, and they are demodulated correspondingly in the receiver, the channel is time-equalised, characterised in that the channel is time-equalised for some of the frequencies for which the signal-to-noise ratio is more favourable that it is for other frequencies.

From this viewpoint, the sender unit may even be located in a satellite. In this context of DMT mode modulations, it is also known that one of the frequency bands is designed to convey a pilot signal, typically a signal at a fixed frequency, loaded with no information but useful especially to perform a synchronisation. In electrical type distributed networks, it is also necessary to convey signalling information, or even addressing information, at low bit rates. Signalling signals such as these are, for example, remote control signals used in home automation installations for the putting into operation, from a central panel, of a washing machine at a pre-planned time, or an oven or else again for turning off a central heating system in certain rooms only when the dwellers are absent. Or else, a panel of this kind will be used to manage the remote monitoring and operation of the intrusion detectors in the building. Despite the diversity of this type of equipment, the quantity of information to be transmitted is small. It does not require the bit rates referred to here above and the transmission is generally by specialised links (which themselves imply a modification of infrastructure through the passage of specialised wires).

In the invention, this problem is resolved without the need to draw any specialised lines by taking advantage, in the context of a modulation in DMT mode, of the presence of a pilot signal. In practice, the invention uses a frequency band adjacent to that of the pilot signal and a signal conveyed by this adjacent frequency band is compared with the signal conveyed by the pilot frequency band. In the adjacent band, the modulation is preferably a PSK or Phase Shift Keying type of modulation. It will then be shown that it is enough, during one and the same period, to measure the signals delivered in these two frequency bands, multiply one of them by the other, transmit the results of this multiplication to an accumulator and test the result of this accumulator at selected points in time to deduce the phase therefrom and, therefore, the information conveyed by the adjacent frequency band. A low-cost means is then obtained for distributing information elements at low bit rate.

BRIEF DESCRIPTION OF THE DRAWINGS

An object of the invention is also a method of transmission between a transmitter and a receiver in which
- a stream of information is sent from the sender unit according to a modulation in DMT mode,
- one of the carrier frequencies of this mode of modulation is used as a pilot frequency, characterised in that
- a carrier frequency in this modulation mode, adjacent to the pilot carrier frequency, is modulated according to a PSK type modulation.

The invention will be understood more clearly from the following description and the appended figures. These figures are given purely by way of an indication and in no way restrict the scope of the invention. Of these figures:

FIG. 2 is a schematic view of a specialised unit, or master (typically a decoder), acting as an organiser of the transmissions in the network;

FIG. 5 is a schematic view of QAM (Quadrature Amplitude Modulation) types of modulation, for several constellations;

FIGS. 6 and 7 illustrate the implementation of a pilot frequency and an adjacent frequency, both PSK modulated, enabling the transmission of the signalling signals at low bit rate.

DESCRIPTION OF THE PREFERRED EMBODIMENTS

Figure 1:
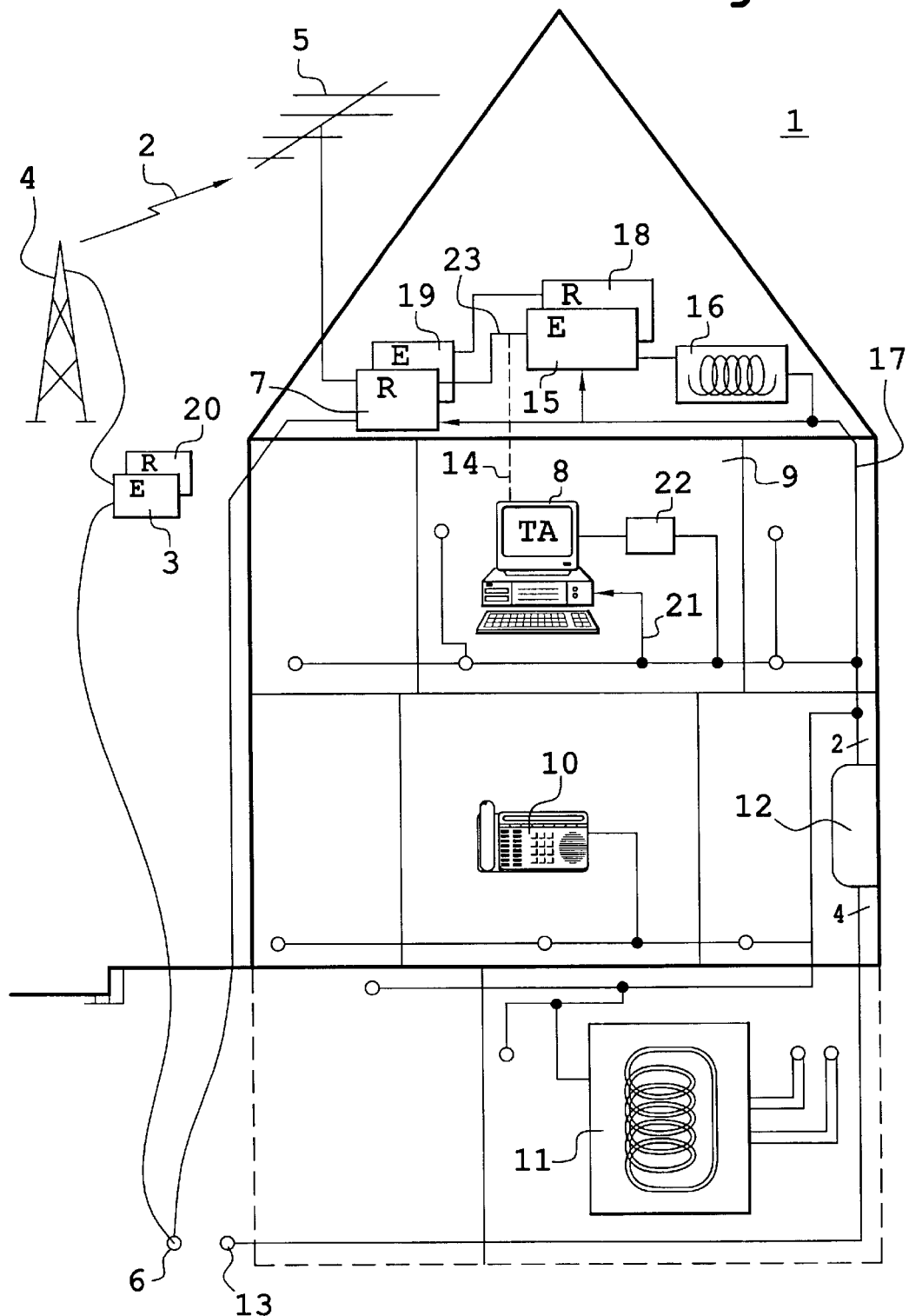
FIG. 1 is a schematic view of a building, a house, in which the method of the invention can be implemented

FIG. 1 shows a dwelling 1 that can be used to implement the method of the invention. Binary information elements at high bit rate 2 come from a remote sender unit 3. To this end, the sender unit 3 is connected, for example, by a cable to an antenna 4 radiating towards an antenna 5 of a user. Or else, the sender unit 3 is connected to a cable 6 which, in particular, is a coaxial and underground cable. The cable 6 and/or the antenna 5 are connected to a specialised receiver 7 which is thus linked to the remote sender unit 3. In practice, the specialised receiver may be a receiver of the television decoder type, especially because the signals conveyed by RF transmission or by the cable 6 will be modulated at very high frequency, for example at 2000 MHz.

The specialised receiver 7 retransmits the steam of information in real time to a user terminal 8. In practice, the user terminal 8 may be a microcomputer. This user terminal may be placed in any one of the rooms 9 of the building 1. The user terminal may be different in nature. For example, it may be a television set or a telephone 10, in which case the binary information elements to be transmitted will at least partially be voice information. The user terminal may also be an installation of the house such as a hot-water heating circuit 11, in which case the information to be transmitted will not necessarily be information transmitted at high bit rate but only signalling or control information.

The invention makes good use of the existence of an electrical distribution network 17 connected, for example, by means of an electrical meter 12 to a public electrical power supply mains system 13. While the connection between the meter 12 and the network 13 may be a three-phase, four-wire type of connection, the internal connection in the building 1 will preferably be a single-phase two-wire connection or possible three-wire connection with an earth connector. In the invention, the sender unit 3 is considered to be distant from the receiver 7, while the terminal 8 is close to the receiver 7. In the prior art, the link between the receiver 7 (which could quite simply be a modem) and the terminal 8 was a direct specialised link 14.

In the invention a sender unit 15 is placed at the output of the receiver 7. This sender unit 15 is connected by a coupler 16 to the electrical network 17. The assembly formed by the receiver 7, the sender unit 15 and the coupler 16 forms what is hereinafter called the specialised receiver. The reception and decoding functions of the receiver 7 are known. Similarly, the functions and structures of the couplers such as 16 are known. Care will be taken in the invention, therefore, to give a more precise description of the structure of the sender unit 15. The link, as shown, enables transmission, from the sender unit 3 to the user terminal 8, in passing through the specialised receiver 7-15-16. In the other direction, the specialised receiver 7-5-16 will be complemented by a specialised sender unit 16-18-19 that has a complementary structure and can be linked with a remote receiver 20. In particular, the sender unit 19 transcodes the information elements to be transmitted to the remote receiver 20. The remote receiver 20, along with the sender unit 3, forms a remote sender unit/receiver. Naturally, the terminal 8, in addition to an electrical power supply 21 from the electrical network, is coupled to this electrical network by an interface 22 which also processes the transmitted information in an operation comparable to that of the sender unit 15, the receiver 18 and the coupler 16.

In the invention, therefore, the stream of information is transmitted by carrier current channel between the specialised receiver and the user terminal 8. This transmission is reversible, the terminal 8 communicating with the receiver 18. The receiver 18 can then either use the sender unit 19 to get connected to the receiver 20, or use the sender unit 15 in order to transmit information to another terminal connected to the electrical supply network 17. This other terminal will preferably be another microcomputer although it has been shown here that the other terminal could be a telephone 10 or a simple electrical device 11.

In this respect, the invention can then be used to set up a local area network of transmission among several microcomputers. Since the total bit rate of the installation is high, in practice several tens of Mbits, the bit rate can pass through a master circuit, constituted by the sender unit 15 and the receiver 18, may suffering any deterioration that makes it useless. These two units together play the role of a passbridge for the transmission of information between several user terminals. In this respect, the sender unit/receiver 15-18 can be placed in the specialised receiver 7-15-16-18-19, namely the television decoder as mentioned here above. Nevertheless, it could also be placed in any of the terminals 8. In this case, a link 23 between a decoder 7-19 of this kind and the rest of the master circuit 15-16-18 should be specialised link.

It has been shown that the various pieces of equipment are linked both by the electrical power supply links to the network 17 and by functional links, by the couplers 16. The connection outlet on the network 17 may nevertheless be a single outlet, and the couplers 16 could be located inside the specialised receiver or the terminal 8. Besides, these devices could be provided with independent electrical supplies: basically, in the invention, they use the power supply network 17 only to transmit information at high bit rates. Similarly, the network 17, shown in a preferred way as an electrical supply network, could be a telephone transmission network of the building 1. In a regional framework (several tens of kilometres), these networks could be a regional electrical mains supply network or a long-distance wire telephone network.

FIG. 2 shows a preferred architecture of the means used in the invention to transmit information at high bit rate. Typically, the unit formed by the sender unit 15 and the receiver 18 works under the control of a microprocessor 24 linked, by an address, data and control bus 25 to a programme memory 26, a data memory 27. The bus 25 is also linked with the receiver 7 and the sender unit 19. The receiver 7 and the sender unit 19 are of a known type.

The programme memory 26 has a programme 28 provided especially with a sub-programme 29 for implementing a modulation in DMT mode. To this end, the sender unit 15 has a multifrequency type modulator circuit 30. The modulator circuit 30 thus has modulators such as 31 each capable of modulating a carrier. Preferably, the number of modulators is a power of 2 ($2^N$ carriers). Each modulator such as 31 of the modulator circuit 30 receives data signals I and Q (of a known type) at input, that are produced by the receiver 7 and transmitted to it by the microprocessor 24. Centre frequencies of the contiguous bands f1, f2 f$2^N$ are separated from one another by a constant pitch. These bands form an orthogonal base. In one example, N is equal to 7 and there are 128 frequencies, each frequency band having a width of 39,0625 KHz.

Because the signals I and Q are digital, a modulator circuit 31 is, for example, a phase accumulation circuit of the kind known in mobile telephony. The modulator circuit 31 delivers analog signals that are added up by simple superimposition in an adder 32. In practice, the adder 32 may be a simple connection point of all the outputs of the modulator circuits such as 31. The adder 32 is connected downline to the coupler 16 before connection to the electrical network 17.

In reception in the terminal 8, the interface 22 has a coupler 33 and a demodulator 34. As indicated by Maurice Bellenger in *Traitement numerique du signal* ("Digital Signal Processing"), Dunod, Paris 1998, the multifrequency modulation of the modulator 30 can be likened to a reverse Fourier transform. In this case, in demodulation, a Fourier transform circuit will be used for the extraction, from each frequency component, of the binary information that it has conveyed. In practice, Fast Fourier Transform or FFT circuits 34 will be used. In practice, this modulation and this demodulation are made in software form, the notions of phase, adder and Fast Fourier Transform circuits (FFT) being presented only to illustrate the processing that is undertaken.

Figure 3A:
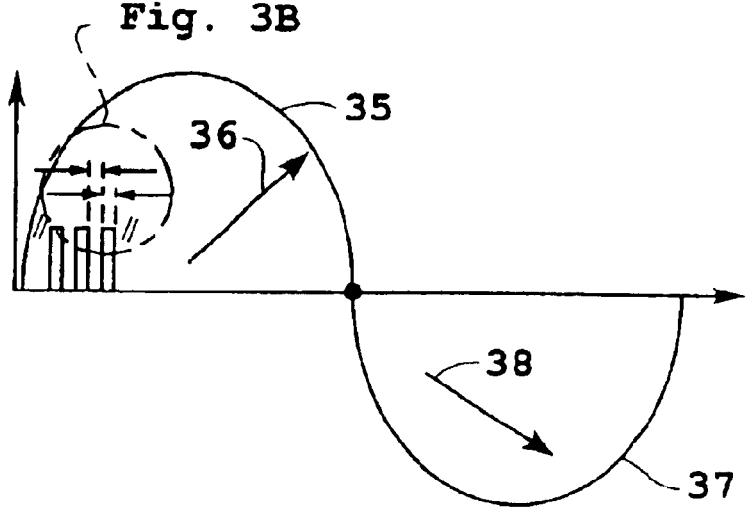
FIG. 3A is a timing diagram used to indicate the preferred values of setting the parameters of the different circuits that come into action in the method of the invention.

FIG. 3A gives a view of an upward type of transmission in an odd-value half-wave 35 whereas, during a following even-value half-wave 37 the corresponding transmission 38 is downward. Conventionally, an upward transmission means that the terminal 8 speaks to the master circuit 15, 18, while a downward transmission implies transmission in the reverse direction. However, a different convention may be chosen, especially on the meaning to be given to the even-value and odd-value half-waves.

Figure 3B:
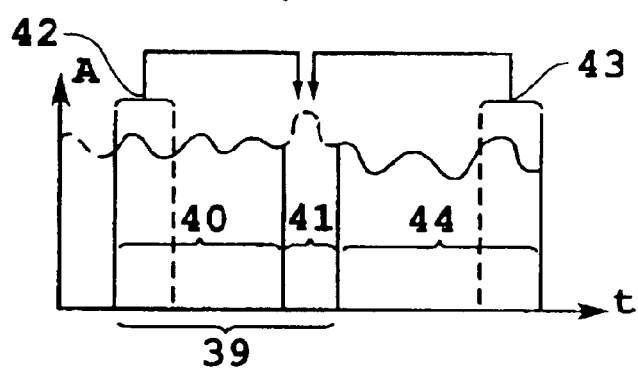
FIG. 3B is an enlarged view of the timing diagram of FIG. 3A.

In any case, since the channel has a non-zero delay pulse response, there is a certain build-up time for a voltage that corresponds to the application of a voltage step. Reference is made here to the changes undergone by a signal in binary theory. This signal, after demodulation in the circuit 34, reaches its final value in analog terms only after a delay time. Referring to the enlarged view depicted in FIG. 3B, signal transmission periods 39 are then subdivided (in one direction or the other), into transmission periods 40 interlaced with guard time periods 41. The demodulation indicated here above in an FFT type circuit 34 is however warranted only if the signal to be demodulated is periodic. The existence of this guard time 41 is then profitably used to make the modulator 30 send a repetition of a part of the signals sent during the useful duration of transmission 40. In this case it is possible either to bring about the transmission, during the period 41, of a preamble 42 sent during the period 40, or to bring about the transmission of a final part 43 of the signal sent during a period 44 that immediately follows the guard time 41. A periodisation of this kind is of a known type.

Circuits 45 (FIG. 2) entrusted with carrying out the periodisation could be circuits that set up a cyclical prefix 41. A simple delay line whose duration is equal to the duration 39 may be used to this effect. A block 44 to be sent is thus delayed by a duration equal to the transmission period 39 whereas it is also the case that the final part 43 of the block 44 can pass freely, before the block itself. A simple selection switch circuit could be used to make a circuit 45 of this kind. In reception in the circuit 22, an inverted cyclical prefix circuit 46 simply comprises a windowing circuit to remove the repeated component corresponding to the periods 41. Here too, the performance of these functions is in software rather than matrix form.

In practice, the duration 39 corresponds to the taking and processing of 256 samples by the circuit 34, when this circuit 34 is driven in a standard way by a 10 MHz clock. In this case, the time for taking these 256 samples is 25.6 microseconds. The number of 256 samples corresponds to the 128 frequencies used. In applying Shannon's principle, it is necessary to take twice as many samples as there are frequencies implemented. The number of samples is therefore equal to $2^{N+1}$. The number of frequencies in terms of power of two is dictated by the use of FFT type functions that preferably work on numbers of samples which are powers of two.

Furthermore, on an entire period of the alternating power supply signal comprising half-waves 35 and 37 with a duration of 20 milliseconds, it has been chosen to set up 640 periods such as 39. This means a period 39 with a duration of 31.25 microseconds and a guard time 41 with a duration of 5.6 microseconds. By acting in this way and by choosing a QAM8 type modulation as the type of modulation in each of the circuits 31, it is possible, during each period 39, to send eight bits per carrier frequency, namely 1 Kbit during 128 carriers during a period 39. This leads to a theoretical bit rate of 32 Mbit per second for the channel. Assuming an alternating duplex operation as indicated in FIG. 3A, it is possible to have a useful inter-terminal bit rate of 16 Mbit per second, or a bit rate between the master and any one of the terminals of 32 Mbit per second. This bit rate is conveyed in a passband ranging between 300 KHz and 6 MHz, which is easy to obtain in the network 17.

According to what has been stated above, owing to the existence of the tree-like distribution of the network 17, the carrier current channel has a lengthy pulse response, typically equal to fifteen microseconds. In the invention, to reduce a corresponding guard time that must be instituted to prevent intersymbol interference (between the signals sent during the periods 40 and 44), it is planned to set up a time equaliser 47 between the adder 32 and the coupler 16 (FIG. 2).

Figure 4:
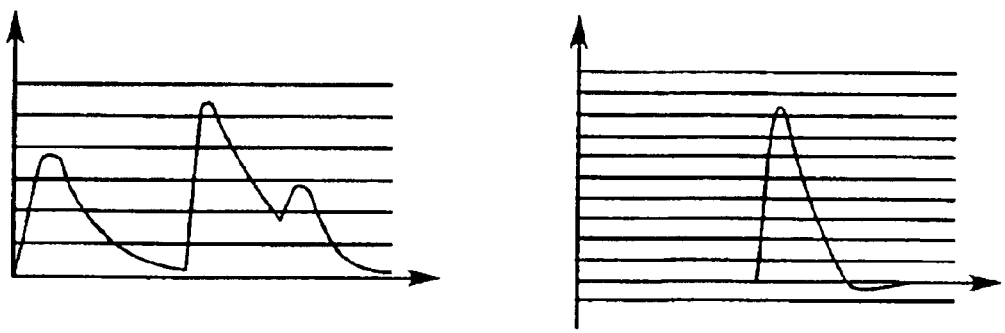
FIG. 4 is a schematic view of the working of a time equaliser filter.

FIG. 4 gives a wholly schematic view of a role of a time equaliser of this kind. FIG. 4 shows, on the left, that first signals modulating a carrier fi are sent at one and the same date as second signals modulating a carrier fj. These first signals reach the terminal 8 at a date prior to the date on which the second signals arrive. The delay is not necessarily due solely to the frequency. It may also be due to modes of reflection on non-adapted terminal points of the network 17. Whatever the reasons for this delay, the different spectral components do not undergo identical durations of propagation. The phenomenon is deterministic although, for the different components, it could vary in the course of time, as a function of the various operations to put the electrical equipment connected to the network 17 into service FIG. 4 shows, in its right-hand part, that the object of the circuit 47 is to delay the spectral components fi whose propagation is faster than that of the components fj whose propagation is slower. Consequently, on the reception date, the terminal 8 receives each of the components fi and fj with an accurate phase, as then had been sent on the date of sending.

A circuit 47 such as this is made herein in the form of an FIR or Finite Impulse Response filter. A filter of this kind performs an algebraic type of processing with a finite number of coefficients. The computation of the coefficients of a filter of this kind is not very complex. However, it would be appropriate to place a filter 47 only in the network master and not in each terminal. Indeed, the computation of these coefficients is costly if we take account of all the frequencies. In order to reduce this cost, the coefficients of the filter 47 are computed in taking only the ten frequencies for which the signal-to-noise ratio (and hence the bit rate) is the best. In the invention, to partly resolve this problem of computation cost, it is also planned to place only one equaliser circuit 47 in a network 17. Indeed, to the extent that the circuit 47 can work in sending mode, it can work in reception in the receiver 18. In this case, this circuit 47 is used by means of connections 48 and 49 and a corresponding duplexer (not shown), either in the circuit 15 or in the circuit 18. Indeed, the effect can be used as much in the direction described, from the sender unit 15 to the receiver interface 22 as, in the reverse direction, from a sender unit 50 of the terminal 8 to the receiver 18. The filtering may be applied at any time during the transmission: ahead of time in the direction going from the sender unit 15 to the terminal receiver 18, or with a delay in the other direction.

Consequently, the terminals such as 8, 10 or others do not need to have a time equaliser circuit 47 available.

FIG. 2 also shows the presence of other terminals, for example the terminal B and the terminal C, as a complement to the terminal A, 8, envisaged hitherto. Given that the terminals B and C are not necessarily positioned in the same place, in the same room 9, as the terminal 8, the setting of the circuit 47 when it is in communication (in sending or in reception) with the terminal A will be different from the setting when it is in communication with the terminal B or the terminal C.

In order to deal with this problem, the programme 28 has a learning sub-programme 51. The principle of this sub-programme 51 consists in sending each of the spectral components separately from the terminal A to the receiver 18, at very precise, known and well-marked sending dates, and in measuring the different delays of reception by the receiver 18. Thus, for the terminal A, the parameters of setting the circuit 47 are acquired. In the invention it is accepted, although this may be not wholly exact, that the transmission delays in one direction, the downward direction, are the same or have the same distribution as the transmission delays in the upward direction (namely the measured delays). Experience shows that an assumption of this kind, which is unwarranted in principle, provides sufficient simplification to make the presence of a single time equaliser acceptable to the network 17.

However, given an excessively great diversity in the positioning of the terminals A, B and C, it is preferred to provide for different sets of setting coefficients for each of these terminals. Given the changing nature of the network 17, it is even planned to carry out the learning process very regularly, for example at each odd-value half-wave 35, at the start of an upward transmission 36. In this case, the first duration 40 of transmission amounts to the launching of a learning sequence by a terminal A (or another), the one to which the master circuit 15-18 has handed over control. The immediate setting of the circuit 47 provides for accurate reception. Although these settings TEQj are memorised in the memory 27 to be used as a function of need. They are modified therein as and when new connections are made.

The DMT mode of modulation furthermore makes it necessary to define a type of modulation. According to a preferred mode, the signals fi (f1 to f$2^N$) will be modulated according to a QAMi type modulation as a function of a sub-programme 52 contained in the programme memory 26. As indicated here above, some of the frequencies fi will be penalised by external noises. It is known, especially, that the band located around 600 KHz is already penalised by the radio amateur operators. Ultimately, the signals transmitted in these different bands are subjected to noises in varying degrees.

In the invention it is planned that if, for a frequency band, a signal-to-noise ratio is low, then the index of modulation will be low whereas, if the signal-to-noise ratio is high, then the index of modulation could be higher. For example, FIG. 5 shows a QUAM2 four-point constellation enabling the transmission, on a carrier frequency, of two bits during a period 39. Just to the right, a modulation with eight constellation points is shown, enabling the transmission of 3 bits with a QAM3 modulation. In the optimum case, it is possible to transmit 10 bits on a carrier with a QAM10 modulation with 1024 constellation points.

Similarly, it has been discovered in the invention that the setting of the time equaliser is influenced by the noise present in the different frequency bands. In its principle, a perfect time equaliser must have an effect in which a signal step is transmitted as a signal step that is ideally identical. In the invention, it has been realised that, if a conversion of this type were to be done, the result then would be that the noise-ridden channels too would be transmitted very well: the noise contribution made by these noise-ridden channels would be ultimately increased. To then prevent this deleterious effect, the idea has arisen bringing about the time equalisation only for channels for which the signal-to-noise ratio is good.

In practice, given that it is possible, during the learning period, to measure not only the transmission delays of the different channels but also the quantity of noises received on each of these channels, it is possible to determine the best of them. In a particularly practical example on 128 channels, it has thus been resolved to process only the ten best. Consequently, there has been a notable reduction in the complexity of the equaliser 47 since, instead of processing 128 channels, it processes no more than ten of them. Furthermore this reduction is obtained without any real deterioration and even with an improvement in transmission quality. This occurs because, in most cases, the channels that are not temporally reset are noise-ridden channels for which, furthermore, in order to take account of the noise, a certain redundancy is brought about in lowering the index of modulation. By acting in this way, a particularly efficient and low-cost sender unit 15 is obtained.

The transfer function of the channel followed by the time equaliser 67 is optimised so as to be as short as possible. However, it does not constitute a Dirac pulse and its Fourier transform is not identically equal to one. For each frequency of the DMT modulation, this results in a complex gain. In order to correct the effect of this complex gain, the result of the FFT in the receiver for each carrier is preferably multiplied by a corrective factor equal to the reverse of the complex gain of the channel and of the equaliser for the frequency considered. Thus, since certain frequency components are more particularly attenuated than others, a frequency equaliser 52 is placed in the transmission chain. This frequency equaliser, like the time equaliser 47, can be implemented in only one of the two devices: the sender unit 15 or the sender unit/receiver 22. In the case shown, it has been implemented in the sender unit/receiver 22. In this case, in the downward direction, the frequency equaliser 52 will have a spectrum-restoring role whereas, in the upward direction, it will have a spectral pre-accentuating role.

FIGS. 6 and 7 show a particular feature of implementation of the transmission method of the invention. Indeed, for addressing operations and for settings of different electrical machines, it is important to get synchronised and transmit information at low bit rates in a particularly efficient way. In the DMT mode, it is known that one of the carrier frequencies is used as a pilot frequency. It is sent in pure form without modulation. In the invention, the pilot frequency 53 chosen (FIG. 6) is a constant alternating signal with a low frequency. For example, to avoid problems of harmonics, the component with the index 13 has been chosen with a frequency equal to 13 times 39.0625 KHz. The component 53 thus makes it possible, in association with a counter, to synchronise clocks present in the microprocessor 24 as well as in a microprocessor (not shown) of the terminal 8 and/or the receiver 22.

To transmit information at low bit rate the invention then, in a particularly simple solution, uses a frequency component 54 adjacent to the pilot frequency. Here it has been shown that the frequency component used was a frequency component 54 higher than the pilot frequency, namely 14 times 39.0625 KHz.

As shown, the signals conveyed by these two components 53 and 54 pass through zeros at the same time at dates t1 and t2 separated by a duration 39 of 25,6 microseconds. The received signal, transmitted by the coupler 33, is made to pass into a filter 55 that lets through only the component 53 (at 13 times 39.0625 KHz) whereas another parallel-connected filter 56 lets through only the adjacent component 54 (at 14 times 39.625 KHz). The signals produced are detected in downline detectors, respectively 57 and 58. At output of the detectors 57 and 58, positive or negative binary signals are obtained as and when half-waves of the signals 53 and 54 are transmitted. By multiplying the signals produced by the detectors 57 and 58 in a multiplier 59, and by integrating the output signal of the multiplier 59 in an accumulator 60, a signal is obtained whose value changes slowly. This signal is depicted, on the whole, by the indications 61 and 62 as being equal to +1 in the first part of the duration t1 t2 and as being equal to −1 during the second part of this duration. The one-bit multiplier 59 is, in practice, a simple AND logic gate. At an intermediate date t3, located just in the middle of the duration between the dates t1 and t2, the signal delivered by the accumulator 60 is zero.

FIG. 6 herein shows a phase of the signal 54 that is zero at the date t1. It can be imagined that, if this phase were not zero at the date t1, then at the date t3 the output signals from the accumulator 60 would not be zero. They would be offset, in varying degrees, in one direction or another depending on the initial phase of the signal 54 on the date t1. In the invention, it is then chosen to transmit a PSK type modulation with 8 constellation points on the adjacent band, that of the signal 54,. And the value at output of the accumulator 60 is detected at the date t3. In other words, it is possible to transmit 3 bits during a period of 31.25 microseconds. This leads to an information bit rate of about 96 Kbits per second. There is thus obtained a low bit rate but one that is quite comparable to the known bit for the most efficient modems available in the market.

Rather than a direct adjacency between the component 53 and the component 54, an indirect adjacency could have been chosen with, in the present case, components 11 or 15 times 39.0625 KHz. However, it is necessary to be confined to the low frequencies to provide for a good signal-to-noise ratio. The frequencies of the synchronisation carrier and of the communications carrier at low bit rate must neighbour each other so as to overlook the phase shift induced by the channel between these two frequencies.

What is claimed is:

1. A method for the distribution, at high bit rate, of binary information elements coming from a remote sender unit wherein:
   a stream of information elements is received in a specialized receiver linked to the remote sender unit via an XDSL telephone link; and
   the stream of information elements is transmitted from the specialized receiver to a user terminal located in the vicinity, after decoding in the specialized receiver, by retransmitting the stream of information elements between the specialized receiver and the user terminal on a low voltage home electrical power supply network,
   wherein the information elements of the stream are modulated in the specialized receiver with a discrete multitone (DMT) mode of modulation that is synchronized and spread on $2^N$ carrier frequencies and the information elements are demodulated correspondingly in the terminal.

2. A method for the distribution of binary information elements at high bit rate wherein
   a stream of information elements is transmitted from a user terminal to a specialized sender unit, the user terminal and the specialized sender unit being located in the vicinity of each other; and
   after encoding in the specialized sender unit, the stream of information elements is retransmitted from the specialized sender unit to a remote receiver via an XDSL telephone link,
   wherein the stream of information elements is transmitted by carrier current between the user terminal and the specialized sender unit by a low voltage home electrical supply network, and wherein the stream of information elements is modulated in the user terminal with a discrete multitone DMT) mode of modulation that is synchronized and spread on $2^N$ carrier frequencies, and the stream of information elements is demodulated correspondingly in the specialized sender unit.

3. A method according to the claim 1, wherein
   the binary information elements of the stream are divided into batches of bits,
   the batches are transmitted during durations of transmission, the durations being equal to one another and being separated from one another by a guard time, and
   the transmission of the batches of bits is periodized by the transmission, during the guard times, of information elements corresponding to these batches of bits.

4. A method according to claim 1, wherein
   the carrier current channel is time equalized.

5. A method according to claim 4, wherein
   the coefficients of a time equalizer of the carrier current channel are optimized for frequencies for which the signal-to-noise ratio is better than it is for the other frequencies.

6. A method according to claim 1, wherein
   carriers of the DMT modulation are amplitude modulated and phase modulated (QAM) in a constellation, the number of points of which is greater for frequencies for which the signal-to-noise ratio is better than it is for the other frequencies.

7. A method according to claim 5, wherein
   a learning phase of transmission in sending and in receiving is carried out to know, respectively, the frequencies for which the signal-to-noise ratio is best.

8. A method according to claim 4, wherein
   several terminals are connected to the electrical supply network, and
   time equalization coefficients are modified when passing from a transmission of information between a terminal and the specialized sender unit or specialized receiver to a transmission of information between another terminal and the specialized sender unit or the specialized receiver.

9. A method according to claim 4, wherein
   the carrier current channel is time-equalized only in the specialized sender unit and in the specialized receiver.

10. A method according to claim 1, wherein
    the carrier current channel is equalized in frequency, preferably only in the terminal.

11. A method according to claim 1,
    wherein for the transmission of information elements from a first terminal to a second terminal connected on the same electrical power supply network, the information elements are transmitted from the first terminal to the specialized sender unit, from the specialized sender unit to the specialized receiver, and from the specialized receiver to the second terminal.

12. A method according to claim 1,
wherein the transmissions are synchronized on a date of passage through zero of an alternating electrical supply signal present on the electrical supply network.

13. A method according to claim 1,
wherein one of the carrier frequencies of the DMT modulation mode serves as a pilot frequency, and
another carrier frequency of this modulation mode, adjacent to the pilot carrier frequency, is modulated in a PSK type modulation.

14. A method according to the claim 13, wherein the PSK type modulation is an 8PSK type modulation.

15. A method according to claim 13, wherein the DMT mode of modulation has a DMT mode modulation spectrum having an upper frequency limit, a lower frequency limit, and a frequency midpoint, and wherein
the pilot carrier frequency and the adjacent carrier frequency are frequencies between the lower frequency limit and the frequency midpoint of the DMT mode modulation spectrum.

16. A method according to claim 12, wherein
the adjacency is direct.

17. A method according to claim 12, wherein
the directly adjacent carriers are separated from one another by 39.0625 KHz.

18. A method for the distribution, at high bit rate, of binary information elements coming from a sender unit wherein
a stream of information is transmitted by a channel between a sender unit and a receiver,
the information elements of the stream are modulated in the sender unit with a discrete multitone mode of modulation that is preferably synchronized and preferably modulate on $2^N$ carrier frequencies, and the information elements are demodulated correspondingly in the receiver,
a plurality of carrier frequencies is selected; wherein the selected carrier frequencies have signal-to-noise ratios that are larger than the signal-to-noise ratios of the carrier frequencies that were not selected, and
the channel is time equalized for at least one of the plurality of selected carrier frequencies.

19. A method for the distribution, at high bit rate, of binary information elements coming from a sender unit wherein
a stream of information is transmitted by a channel between a sender unit and a receiver;
the information elements of the stream are modulated in the sender unit with a discrete multitone mode of modulation that is preferably synchronized and preferably on $2^N$ carrier frequencies, and the information elements are demodulated correspondingly in the receiver and
the channel is time-equalized for some of the carrier frequencies for which the signal-to-noise ratio is more favorable than for other carrier frequencies,
wherein the binary information elements of the stream are divided into batches of bits,
the batches are transmitted during durations of transmission, the durations being equal to one another and being separated from one another by a guard time, and
the transmission of the batches of bits is periodized by the transmission, during the guard times, of information elements corresponding to these batches of bits.

20. A method for the distribution, at high bit rate, of binary information elements coming from a sender unit wherein
a stream of information is transmitted by a channel between a sender unit and a receiver;
the information elements of the stream are modulated in the sender unit with a discrete multitone mode of modulation that is preferably synchronized and preferably on $2^N$ carrier frequencies, and the information elements are demodulated correspondingly in the receiver, and
the channel is time-equalized for some of the carrier frequencies for which the signal-to-noise ratio is more favorable than for other carrier frequencies,
wherein carriers of the DMT modulation are amplitude modulated and phase modulated (QAM) in a constellation, the number of points of which is greater for frequencies for which the signal-to-noise ratio is better than for the other frequencies.

21. A method for the distribution, at high bit rate, of binary information elements coming from a sender unit wherein
a stream of information is transmitted by a channel between a sender unit and a receiver:
the information elements of the stream are modulated in the sender unit with a discrete multitone mode of modulation that is preferably synchronized and preferably on $2^N$ carrier frequencies, and the information elements are demodulated correspondingly in the receiver, and
the channel is time-equalized for some of the carrier frequencies for which the signal-to-noise ratio is more favorable than for other carrier frequencies,
wherein a learning phase of transmission in sending and in receiving is carried out to know, respectively, the frequencies for which the signal-to-noise ratio is the best.

22. A method for the distribution, at high bit rate, of binary information elements coming from a sender unit wherein
a stream of information is transmitted by a channel between a sender unit and a receiver;
the information elements of the stream are modulated in the sender unit with a discrete multitone mode of modulation that is preferably synchronized and preferably on $2^N$ carrier frequencies, and the information elements are demodulated correspondingly in the receiver; and
the channel is time equalized for some of the carrier frequencies for which the signal-to-noise ratio is more favorable than it is for other carrier frequencies,
wherein several receivers are connected to the electrical supply network, and
time equalization coefficients are modified when passing from a transmission of information between a receiver and the sender unit to a transmission of information between another receiver and the sender unit.

23. A method for the distribution at high bit rate, of binary information elements coming from a sender unit wherein
a stream of information is transmitted by a channel between a sender unit and a receiver;
the information elements of the stream are modulated in the sender unit with a discrete multitone mode of modulation that is preferably synchronized and preferably on $2^N$ carrier frequencies, and the information elements are demodulated correspondingly in the receiver; and the channel is time-equalized for some of the carrier frequencies for which the signal-to-noise ratio is more favorable than it is for other carrier frequencies, wherein the carrier current channel is time equalized only in the sender unit.

24. A method for the distribution, at high bit rate, of binary information elements coming from a sender unit wherein a stream of information is transmitted by a channel between a sender unit and a receiver;

the information elements of the stream are modulated in the sender unit with a discrete multitone mode of modulation that is preferably synchronized and preferably on $2^N$ carrier frequencies, and the information elements are demodulated correspondingly in the receiver; and the channel is time-equalized for some of the carrier frequencies for which the signal-to-noise ratio is more favorable than it is for other carrier frequencies, wherein the carrier current channel is equalized in frequency, preferably only in the receiver.

25. A method for the distribution, at high bit rate, of binary information elements coming from a sender unit wherein a stream of information is transmitted by a channel between a sender unit and a receiver;

the information elements of the stream are modulated in the sender unit with a discrete multitone mode of modulation that is preferably synchronized and preferably on $2^N$ carrier frequencies, and the information elements are demodulated correspondingly in the receiver; and the channel is time-equalized for some of the carrier frequencies for which the signal-to-noise ratio is more favorable than it is for other carrier frequencies, wherein for the transmission of information elements from a first receiver to a second receiver connected on the same electrical power supply network, the information elements are transmitted from the first receiver to the high bit rate sender unit and from the high bit rate sender unit to the second receiver.

26. A method for the distribution, at high bit rate, of binary information elements coming from a sender unit wherein a stream of information is transmitted by a channel between a sender unit and a receiver;

the information elements of the stream are modulated in the sender unit with a discrete multitone mode of modulation that is preferably synchronized and preferably on $2^N$ carrier frequencies, and the information elements are demodulated correspondingly in the receiver; and the channel is time-equalized for some of the carrier frequencies for which the signal-to-noise ratio is more favorable than it is for other carrier frequencies, wherein the transmissions are synchronized on a date of passage through zero of an alternating electrical supply signal present on the electrical supply network.

27. A method for the distribution, at high bit rate, of binary information elements coming from a sender unit wherein a stream of information is transmitted by a channel between a sender unit and a receiver;

the information elements of the stream are modulated in the sender unit with a discrete multitone mode of modulation that is preferably synchronized and preferably on $2^N$ carrier frequencies, and the information elements are demodulated correspondingly in the receiver; and the channel is time-equalized for some of the carrier frequencies for which the signal-to-noise ratio is more favorable than it is for other carrier frequencies.

wherein the time equalizer is optimized for ten frequencies.

* * * * *